Figure 2:
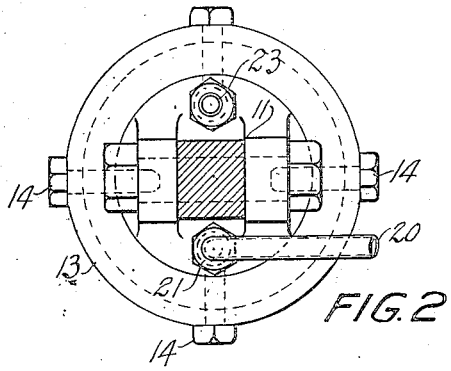

H. H. GILES.
PNEUMATIC VEHICLE SPRING.
APPLICATION FILED DEC. 11, 1916.

1,289,728.

Patented Dec. 31, 1918.
2 SHEETS—SHEET 1.

Inventor
HERBERT H. GILES
By his Attorney
Albert Bersin

H. H. GILES.
PNEUMATIC VEHICLE SPRING.
APPLICATION FILED DEC. 11, 1916.

1,289,728.

Patented Dec. 31, 1918.
2 SHEETS—SHEET 2.

Inventor
HERBERT H GILES
By his Attorney
Albert Bersin

UNITED STATES PATENT OFFICE.

HERBERT H. GILES, OF BROOKLYN, NEW YORK, ASSIGNOR TO GILES ENGINEERING COMPANY, OF NEW YORK, N. Y., A COPARTNERSHIP CONSISTING OF HERBERT H. GILES AND WALDO B. TOURTELLOTTE.

PNEUMATIC VEHICLE-SPRING.

1,289,728.  Specification of Letters Patent.  Patented Dec. 31, 1918.

Application filed December 11, 1916. Serial No. 136,193.

*To all whom it may concern:*

Be it known that I, HERBERT H. GILES, a citizen of the United States, and a resident of Brooklyn, in the county of Kings and State of New York, have invented certain new and useful Improvements in Pneumatic Vehicle-Springs, of which the following is a specification.

The object of this invention is to provide a new and improved pneumatic spring or cushion device intended for use either as a substitute for or in connection with the usual resilient metallic springs of a vehicle, such as an automobile or railroad car.

I obtain this object by providing a cylinder having its top open and preferably attached to the axle of the car, a second cylinder having its top open, sliding within the first cylinder and a third cylinder being open at the bottom and closed at the top sliding within said second cylinder, the three cylinders together forming two independent chambers. The innermost cylinder is preferably attached to the body of the car. The two independent chambers are maintained at the desired pressure by being connected to a pressure source. Suitable inlet and release valves are provided to automatically maintain the desired pressure within the chambers. A fourth cylinder somewhat larger in diameter than the first mentioned cylinder is fitted thereover and is concentric with it forming a third cylindrical chamber around the first cylinder. An additional cylindrical member fitting over and fixed to the third cylindrical member is provided with a flange which fits within the third cylindrical chamber and travels as a piston therein. This last mentioned chamber and piston together with suitable valves are provided to cushion the recoil of the spring. If desirable, the first and third mentioned cylinders may be attached to the usual metallic springs instead of the axle and body of the car respectively.

One of the many features of this device is that it is simple in its construction, strong, durable, efficient in its use, automatically regulated, and comparatively inexpensive.

Other novel features of construction and arrangement of parts will be evident from the detailed description and the accompanying drawings forming a part of this specification, in which similar numerals refer to similar parts in all the views and in which—

Figure 3:
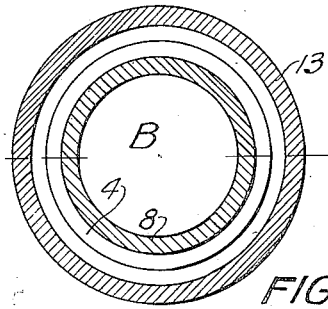
Figure 1:
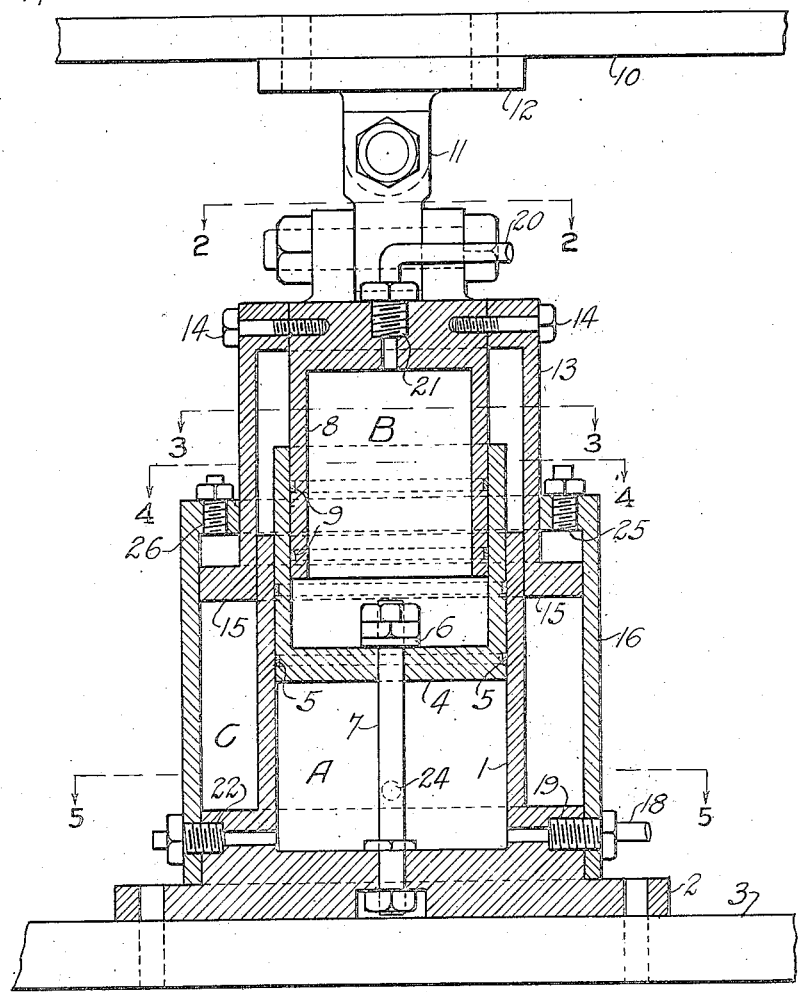
Figure 4:
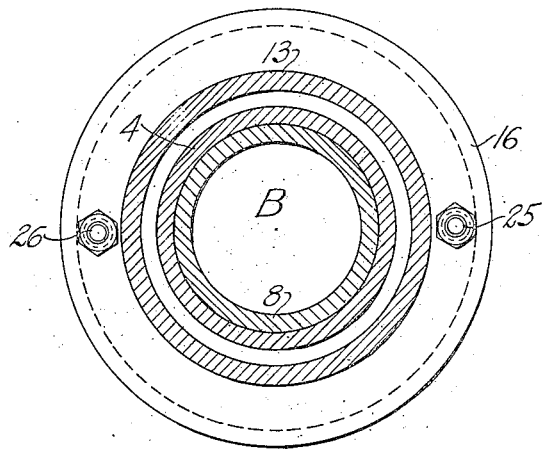
Figure 5:
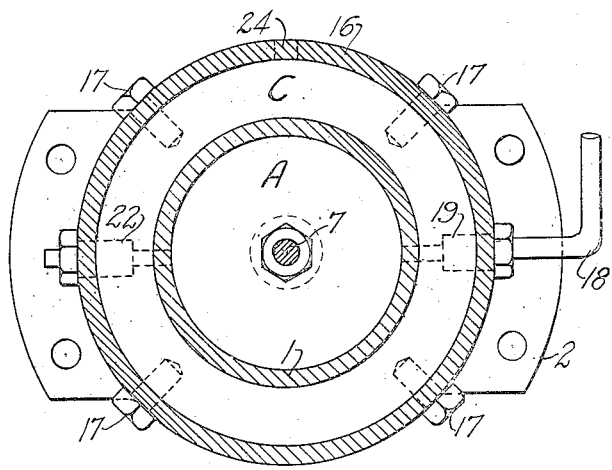

Figure 1 is an elevation of my device with the cylindrical portion shown in section, as indicated on line 1—1 of Fig. 3; Fig. 2 is a section taken on line 2—2 of Fig. 1; Fig. 3 is a section taken on line 3—3 of Fig. 1; Fig. 4 is a section taken on line 4—4 of Fig. 1 and Fig. 5 is a section taken on line 5—5 of Fig. 1.

Referring to the drawings, the cylinder 1 open at the top and provided with a flange 2 at the bottom is attached to an axle 3 of a vehicle by means of bolts or otherwise. The cylinder 4 open at the top and closed at the bottom is adapted to slide within the cylinder 1 and is provided with the packing rings 5 to make the chamber A air-tight. The cylinder 4 is kept at its uppermost position by means of the washer 6 fitting over the rod 7 which is in turn screwed into the bottom of the cylinder 1 as shown in Fig. 1. The cylinder 8 open at the bottom and closed at the top is adapted to slide within the cylinder 4 and is provided with packing rings 9 to make the chamber B air-tight. The cylinder 8 is attached to body of the vehicle 10 preferably by means of the members 11 and 12 which together form a universal joint as is clearly shown in Figs. 1 and 2. The cylindrical member 13 shaped as shown in Fig. 1 is fastened to the head of the cylinder 8 by means of bolts 14 and is provided with a flange 15 while its interior diameter is such as to fit over the outer surface of the cylinder 1. The cylindrical member 16 fitting over the flange 15 of the cylindrical member 13 is fixed to the flange of the cylinder 1 by means of bolts 17 while at the top its bore is reduced so as to fit over the outer surface of the cylinder 13. The flange 15 acts as a piston sliding within the cylindrical chamber C formed by the sides of the cylinders 1 and 16. The chamber A is connected to a pressure source by means of the pipe 18 and is provided with a check valve 19 at the inlet. The chamber B is connected to the same pressure source by means of the pipe 20 and is provided with a check valve 21 at its inlet. The pressure source is preferably a compressed air tank kept at the proper pressure and stored up when the motor of the vehicle is in operation. In order to automatically release the pressure in the chambers A and B when it exceeds that desirable for soft riding, the adjustable automatic release valves 22 and 23 are provided for the chambers A and B respectively. In order to avoid compressing the air at the bottom of the chamber C as the piston 15 travels downwardly, the port 24 is provided at the bottom of the chamber. The air inlet valve 25 fixed at the top of the cylinder 16 or of the chamber C is of a type well known to the art and will permit air to enter into the chamber C but will not allow it to escape. The automatic air release valve 26 fixed at the top of the chamber C is also of a type well known to the art and will release the pressure in the chamber when it exceeds a predetermined amount. The valve 26 is preferably adjustable so that the maximum pressure in the chambers C may be varied if so desired. It will now be evident that when the piston 15 descends in the chamber C a partial vacuum will be created in the space above the piston. This in turn will cause the valve 25 to open and admit air at atmospheric pressure into the upper portion of the chamber C. When the piston 15 starts to move upwardly, the valve 25 will close and the air confined above the piston will now be compressed until it reaches a predetermined amount when the valve 26 will open and release the pressure. It will be observed that the area of the bottom of the cylinder 4 exposed to the chamber A is larger than that exposed to the chamber B and since the pressure in the two chambers is the same, the bottom of the cylinder 4 will normally be in contact with the washer 6.

The operation of the device is as follows: Let it be assumed that due to an irregularity in the roadway, the axle 3 moved upwardly. This will first cause the cylinder 1 to slide upwardly past cylinder 4 but due to the pressure in the chamber A, the cylinder 4 will move upward, its bottom reacting against the washer 6. Immediately after that, the cylinder 8 will move downwardly sliding past cylinder 4 and the air in chamber B will be compressed. As soon as the pressure in chamber B exceeds that in chamber A, the cylinder 4 will move downwardly compressing the air in chamber A still more. When the pressure in either chamber exceeds a predetermined maximum amount, the release valves 22 or 23 will open and allow the pressure to drop to the predetermined amount. While this is taking place, the piston 15 is moving downwardly in chamber C and due to a partial vacuum being formed in chamber C above the piston, air at atmospheric pressure will enter the chamber through the valve 25. After the body 10 has reached its lowest position, the recoil will send it upwardly, and the cylinders 4 and 8 will move upwardly. This will cause the air in chamber C above the piston 15 to be compressed and it will therefore retard the upward motion of the body 10. When the pressure in the upper portion of the chamber C exceeds a predetermined amount, the valve 26 will open and allow the pressure to be reduced.

It will be noted that while the uppermost position of cylinder 4 is limited by the washer 6, it will occupy a plurality of positions in the chamber A as the pressures in chambers A and B are alternately varied as the vehicle is vibrated. It will also be evident that the alternate variations in pressure in the chambers A, B and C will provide a very elastic spring action.

While I have shown the preferred form of my device, many modifications may be made embodying the essential principal thereof. I therefore do not wish to limit myself to the exact details shown, but wish to include all equivalent devices.

Having thus described my invention I claim as new and wish to secure by Letters Patent:

1. In a pneumatic vehicle-spring, the combination of three telescoping cylinders, each of the cylinders having one end open, the three cylinders together forming two independent chambers, and a pressure source connected to each of said chambers, adapted to maintain the interior of said chambers at a pressure sufficient to sustain the weight of the car, the said cylinders being adapted to telescope and compress the air within the chambers when the vehicle is vibrated whereby a spring action is obtained.

2. In a pneumatic vehicle-spring, the combination of three telescoping cylinders, each of the cylinders having one end open, the three cylinders together forming two independent chambers, a pressure source connected to each of said chambers, adapted to maintain the interior of said chambers at a pressure sufficient to sustain the weight of the car, the said cylinders being adapted to telescope and compress the air within the chambers when the vehicle is vibrated whereby a spring action is obtained and release valves in each of said chambers adapted to release the pressure in said chambers when it exceeds a predetermined amount.

3. In a pneumatic vehicle-spring, the combination of a plurality of telescoping cylinders, each of said cylinders having one end open, the cylinders together forming two chambers one above the other and one chamber encircling the other two, a piston sliding within said external chamber and fixed to the uppermost cylinder, a pressure source connected to each of said interior chambers adapted to maintain the interior of said chambers at a pressure sufficient to sustain the weight of the car, the said cylinders being adapted to telescope and compress the air within the said interior chambers when the vehicle is vibrated whereby a spring action is obtained and a valve connected to said external chamber above the piston adapted to permit air at atmospheric pressure to enter into said chamber and to prevent the air from escaping therefrom, whereby the air within said chamber is compressed when the piston is moved upwardly and thereby the upward motion of the body is retarded.

4. In a pneumatic vehicle-spring, the combination of a plurality of telescoping cylinders, each of said cylinders having one end open, the cylinders together forming two chambers one above the other and one chamber encircling the other two, a piston sliding within said external chamber and fixed to the uppermost cylinder, a pressure source connected to each of said interior chambers adapted to maintain the interior of said chambers at a pressure sufficient to sustain the weight of the car, the said cylinders being adapted to telescope and compress the air within the said interior chambers when the vehicle is vibrated whereby a spring action is obtained, a valve connected to said external chamber above the piston adapted to permit air at atmospheric pressure to enter into said chamber and to prevent the air from escaping therefrom whereby the air within said chamber is compressed when the piston is moved upwardly and thereby the upward motion of the body is retarded, and release valves in each of said chambers adapted to release the pressure in said chambers when it exceeds a predetermined amount.

5. In a pneumatic vehicle-spring, the combination of three telescoping cylinders, each of the cylinders having one end open, the three cylinders together forming two independent chambers, a pressure source connected to each of said chambers, adapted to maintain the interior of said chambers at a pressure sufficient to sustain the weight of the car, the said cylinders being adapted to telescope and compress the air within the chambers when the vehicle is vibrated whereby a spring action is obtained, release valves in each of said chambers adapted to release the pressure in said chambers when it exceeds a predetermined amount, and means for limiting the uppermost position of the middle cylinder.

6. In a pneumatic vehicle-spring, the combination of three telescoping cylinders, each of the cylinders having one end open, the three cylinders together forming two independent chambers, a pressure source connected to each of said chambers, adapted to maintain the interior of said chambers at a pressure sufficient to sustain the weight of the car, the said cylinders being adapted to telescope and compress the air within the chambers when the vehicle is vibrated whereby a spring action is obtained, release valves in each of said chambers adapted to release the pressure in said chambers when it exceeds a predetermined amount, a rod fixed to the base of the lowest cylinder and passing through the base of the middle cylinder and a washer fitting over said rod and held in position by lock nuts adapted to limit the uppermost position of the middle cylinder.

7. In a pneumatic vehicle-spring, the combination of a cylinder having a closed base and open top fixed to the axle of a vehicle, a second cylinder having a closed base and open top fitting within said first cylinder, a third cylinder having its bottom open and fitting within said second cylinder and fixed to the body of the vehicle, the three cylinders together forming two chambers one above the other, another cylinder fixed to the bottom of said first cylinder, having a diameter larger than the first cylinder forming a chamber between the last and first mentioned cylinders, a cylindrical piston sliding within said last mentioned chamber and fixed to the uppermost cylinder, a pressure source connected to each of said interior chambers adapted to maintain the interior of said chambers at a pressure sufficient to sustain the weight of the car, the said cylinders being adapted to telescope and compress the air within the said interior chambers when the vehicle is vibrated whereby a spring action is obtained, and a valve connected to said external chamber above the piston adapted to permit air at atmospheric pressure to enter into said chamber and to prevent the air from escaping therefrom, whereby the air within said chamber is compressed when the piston is moved upwardly and thereby the upward motion of the body is retarded.

8. In a pneumatic vehicle-spring, the combination of a cylinder having a closed base and open top fixed to the axle of a vehicle, a second cylinder having a closed base and open top fitting within said first cylinder, a third cylinder having its bottom open and fitting within said second cylinder and fixed to the body of the vehicle, the three cylinders together forming two chambers one above the other, another cylinder fixed to the bottom of said first cylinder having a diameter larger than the first cylinder forming a chamber between the last and first mentioned cylinders, a cylindrical piston sliding within said last mentioned chamber and fixed to the uppermost cylinder, a pressure source connected to each of said interior chambers adapted to maintain the interior of said chambers at a pressure sufficient to sustain the weight of the car, the said cylinders being adapted to telescope and compress the air within the said interior chambers when the vehicle is vibrated, whereby a spring action is obtained, a valve connected to said external chamber above the piston adapted to permit air at atmospheric pressure to enter into said chamber and to prevent the air from escaping therefrom, whereby the air within said chamber is compressed when the piston is moved upwardly and thereby the upward motion of the body is retarded, and release valves in each of said chambers adapted to release the pressure in said chambers when it exceeds a predetermined amount.

Signed at Brooklyn, in the county of Kings, State of New York, this 8th day of December, 1916.

HERBERT H. GILES.